(12) United States Patent  
Chang et al.

(10) Patent No.: US 9,357,708 B2  
(45) Date of Patent: Jun. 7, 2016

(54) FLEXIBLE ROBOTIC MANIPULATION MECHANISM

(75) Inventors: Chu-Yin Chang, Plano, TX (US); James D. English, Newton, MA (US); Pablo A. Valdivia y Alvarado, Cambridge, MA (US)

(73) Assignee: Energid Technologies Corporation, Cambridge, MA (US)

(*) Notice: Subject to any disclaimer, the term of this patent is extended or adjusted under 35 U.S.C. 154(b) by 1637 days.

(21) Appl. No.: 12/435,873

(22) Filed: May 5, 2009

(65) Prior Publication Data

US 2009/0293442 A1 Dec. 3, 2009

Related U.S. Application Data

(60) Provisional application No. 61/126,382, filed on May 5, 2008.

(51) Int. Cl.
| | |
|---|---|
| *A01D 46/30* | (2006.01) |
| *A01D 46/26* | (2006.01) |
| *B25J 9/00* | (2006.01) |
| *B25J 18/02* | (2006.01) |
| *B25J 18/06* | (2006.01) |
| *A01D 46/00* | (2006.01) |
| *B25J 5/00* | (2006.01) |

(52) U.S. Cl.
CPC ............... *A01D 46/30* (2013.01); *A01D 46/26* (2013.01); *B25J 9/0084* (2013.01); *B25J 18/02* (2013.01); *B25J 18/06* (2013.01)

(58) Field of Classification Search
CPC .......... B25J 18/06; B25J 18/025; B25J 18/02; B25J 9/0084; B25J 9/162; B25J 9/1635; B25J 9/1682; B25J 9/1697; A01D 46/30; A01D 46/26
USPC ............................... 700/245–264; 901/21, 47
See application file for complete search history.

(56) References Cited

U.S. PATENT DOCUMENTS 3,200,575 A * 8/1965 Hurst ........................... 56/328.1  
4,519,193 A * 5/1985 Yoshida et al. .............. 56/328.1  
(Continued)

OTHER PUBLICATIONS

Harrell, et al. "A fruit-tracking system for robotic harvesting." Machine Vision and Applications, vol. 2, Issue 2, 1989, pp. 69-80.*

(Continued)

*Primary Examiner* — Khoi Tran  
*Assistant Examiner* — Dale Moyer  
(74) *Attorney, Agent, or Firm* — Brian J. Colandreo; Mark H. Whittenberger; Holland & Knight LLP

(57) ABSTRACT

A robotic system and apparatus is provided. The apparatus may include a housing having a flexible manipulating mechanism operatively connected with the housing. The flexible manipulating mechanism may include an end effector configured to manipulate an object. The apparatus may further include a first imaging device associated with the housing, the first imaging device configured to indicate a position of an object. The apparatus may also include a computing device configured to receive an imaging signal from the first imaging device and to direct the flexible manipulating mechanism towards the object based upon, at least in part, the imaging signal. Numerous other embodiments are also within the scope of the present disclosure.

23 Claims, 15 Drawing Sheets

(56) References Cited

U.S. PATENT DOCUMENTS

| | | | | |
|---|---|---|---|---|
| 4,532,757 A | * | 8/1985 | Tutle | 56/328.1 |
| 4,663,925 A | * | 5/1987 | Terada | 56/328.1 |
| 4,975,016 A | * | 12/1990 | Pellenc et al. | 414/501 |
| 5,816,769 A | * | 10/1998 | Bauer et al. | 414/680 |
| 5,946,896 A | * | 9/1999 | Daniels | 56/328.1 |
| 6,671,582 B1 | * | 12/2003 | Hanley | 700/245 |
| 7,882,686 B2 | * | 2/2011 | Bryan et al. | 56/328.1 |
| 2006/0213167 A1 | * | 9/2006 | Koselka et al. | 56/10.2 A |
| 2008/0177284 A1 | * | 7/2008 | Lee et al. | 606/130 |

OTHER PUBLICATIONS

Hayashi et al. "Robotic harvesting system for eggplants." Japan Agricultural Research Quarterly, Volumen 36, Issue 3, 2002, p. 163-168.*
Sarig. "Robotics of fruit harvesting: a state-of-the-art review." Journal of Agricultural Engineering Research, vol. 54, Issue 4, 1993, pp. 265-280.*
Adsit, P.D., Real-Time Intelligent Control of a Vision-Servoed Fruit-Picking Robot, Ph.D., Dissertation, University of Florida, 1989, pp. 1-148.
Annamalai, P. et al., "Color Vision System for Estimating Citrus Yield in Real-Time," ASAE/CSAE Annual International Meeting, Ottawa, Aug. 1-4, 2004, pp. 12.
Ars Technica, "Multicore, Dual-Core, and the Future of Intel," http://arstechnica.com/articles/paedia/cpu/intel-future.ars, Sep. 13, 2004, 8 pages.
Barber, R.E., "A Macro-Economic Look at the Processed Orange Market," Florida Citrus Mutual, Oct.-Sep. 1998-1999; http://www.flcitrusmutual.com/content/docs/issues/labor/macro_economics.pdf.
Bluethmann, W., et al., "Robonaut: A Robot Designed to Work with Humans in Space," Autonomous Robots, vol. 14, Issue 2-3, Mar. 2003, pp. 179-197.
Bretl, T., et al., "Proceedings of the 2004 International Symposium on Experimental Robotics," Singapore, Jun. 2004, http://sun-valley.stanford.edu/papers/BretlRLKA:2004.pdf, pp. 1-10.
Canny, J., "A Computational Approach to Edge Detection," IEEE Transactions on Pattern Analysis and Machine Intelligence, vol. PAMI-8, No. 6, Nov. 1986, pp. 679-698.
Edan, Y., "Near-Minimum-Time Task Planning for Fruit-Picking Robots," IEEE Transactions on Robotics and Automation, vol. 7, No. 1 Feb. 1991, pp. 48-56.
Edan, Y., et al., "Systems Engineering of Agricultural Robot Design," IEEE Transactions on Systems, Man and Cybernetics, vol. 24, No. 8, Aug. 1994, pp. 1259-1265.
English, J.D., et al., "On The Implementation of Velocity Control for Kinematically Redundant Manipulators," IEEE Transactions on Systems, Man and Cybernetics-Part A: Systems and Humans, vol. 30, No. 3, May 2000, pp. 233-237.
FDOC, Florida Citrus Production Trends 2003-04 through 2012-13, Economic and Market Research Department, Florida Department of Citrus, Nov. 2002, pp. 1-32.
Featherstone,R., Robot Dynamics Algorithms, Kluwer Academic Publishers, Boston, 1987, pp. 1-211.
Fijany, A., et al., "An Efficient Algorithm for Computation of Manipulator Inertia Matrix," Journal of robotic Systems, 7)1 1990, pp. 57-80.
Harrell, R., "Economic Analysis of Robotic Citrus Harvesting in Florida," Transactions of the ASAE, vol. 30, No. 2, 1987, pp. 298-304.
Jimenez, A.R., et al., "A Machine Vision System Using a Laser Radar Applied to Robotic Fruit Harvesting," IEEE Workshop on Computer Vision Beyond the Visible Spectrum: Methods and Applications, 1998, pp. 110-119.
Kender, W., "Robots in our Future," Citrus Industry, Mar. 2003, pp. 14-16.
Kurien, T., "issues in the Design of Practical Multitarget Tracking Algorithms," Multitarget-Multisensor Tracking: Advanced Applications, Y. Bar-Shalom Editor, Artech House, 1990, pp. 43-83.
Muraro, R.P., et al., "Comparative Costs of Growing Citrus in Florida and Sao Paulo (Brazil) for the Jan. 2000 Season," EDIS document FE364, Institute of Food and Agricultural Sciences, University of Florida, Feb. 2003, pp. 1-8.
Pal, N.R., et al., "A Review on Image Segmentation Techniques," Pattern Recognition, vol. 26, No. 9, Feb. 1993, pp. 1277-1294.
Plebe, A., "Localization of Spherical Fruits for Robotic Harvesting," Machine Vision and Applications, 13: 2001, pp. 70-79.
Recce, M., et al., "Vision and Neural Control for an Orange Harvesting Robot," Proceedings of the 1996 International Workshop on Neural Networks for Identification, Control, Robotics, and Signal/Image Processing (NICROSP Aug. 21-23, 1996, pp. 1-9.
Reid, D.B., "An Algorithm for Tracking Multiple Targets," IEEE Transactions on Automatic Control, vol. AC-24, No. 6, Dec. 1979, pp. 843-854.
USDA Citrus, Citrus Fruits 2005 Summary, United States Department of Agriculture, Sep. 2005, 1-51.
USDA Noncitrus, Noncitrus Fruits and Nuts 2003 Summary, United States Department of Agriculture, Jul. 2004, 1-81.
Walker, M.W. et al, "Efficient Dynamic Computer Simulation of Robotic Mechanisms," Journal of Dynamic Systems, Measurement and Control, vol. 104, Sep. 1982, 205-211.
Weeks, A.R., et al., "Detection of Oranges from a Color Image of an Orange Tree," Proceedings of SPIE—vol. 3808, Applications of Digital Image Processing XXII, Jul. 1999, pp. 356-357.
Williams, M. "NEC Develops Multicore Cell Phone Processor," Computerworld, Dec. 2, 2004 http://www.computerworld.com/hardwaretopics/hardware/story/0,10801,97982,00.html, pp. 1-2.
Worthington, P.L., et al., "Object Recognition Using Shape-From-Shading," IEEE Transactions on Pattern Analysis and Machine Intelligence, vol. 23, No. 5, May 2001, pp. 535-542.
Gelski, J., "Take Correct Path in Florida Citrus Revolution," The Grower, Aug. 2002, pp. cover, 5, 10 and 11.
Slaughter, D.C., et al., "Discriminating Fruit for Robotic Harvest using Color in Natural Outdoor Scenes," Transactions of the ASAE, vol. 32(2), Mar.-Apr. 1989, pp. 757-763.
Lilly, K.W., "Efficient Dynamic Simulation of Robotic Mechanisms," Kluwer Academic Publishers, 1993, pp. 1-136.
Citrus Connection, "Florida Department of Citrus," Highlands County Citrus Growers Association, Inc., Jul. 2005, 12 pages.

* cited by examiner

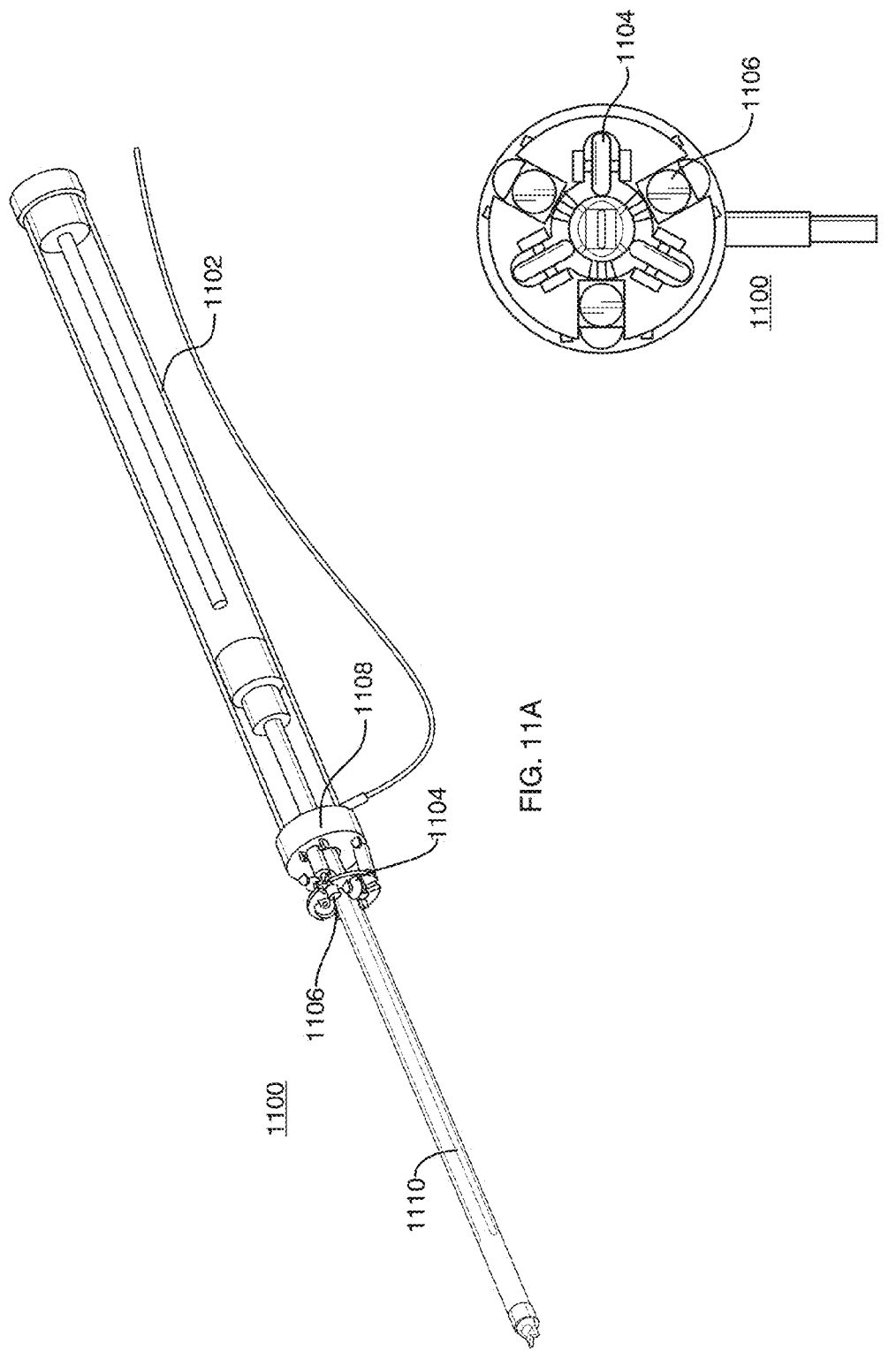

FLEXIBLE ROBOTIC MANIPULATION MECHANISM

RELATED APPLICATIONS

This application claims the priority of the following application, which is herein incorporated by reference: U.S. Provisional Application No. 61/126,382; filed 5 May 2008, entitled: "Robotic Mass Removal of Citrus Fruits."

TECHNICAL FIELD

This disclosure generally relates to robotics. More specifically, the present disclosure is directed towards a robotic manipulation mechanism.

BACKGROUND

Almost all citrus fruit is harvested by hand. Citrus harvesting may require tens of thousands engaged in what is often unrewarding and dangerous labor. The season may last only a few months and the hands involved must find other work off season, with the resulting geographical migration detrimental to migrant families and taxing to stationary communities. The resulting high cost in the United States is burdensome to citrus fruit growers and positions them at a disadvantage to competitors overseas with easy access to cheap labor.

In an attempt to address this problem, bulk citrus removal has been proposed, funded, and acted on with vigor. In multiple waves over the last century, growers—particularly of fruit that is processed into juice—have tried trunk shaking, canopy shaking, raking, and mass mechanical penetration. However, these efforts have disappointed. Where some other crops, such as nuts, olives, cherries and prunes may be economically mass removed, citrus is more difficult as the high forces required, up to 20 pounds for an orange, may not be practicable.

SUMMARY OF DISCLOSURE

In a first implementation of this disclosure, an apparatus may include a housing configured to include at least one flexible manipulating mechanism operatively connected with the housing. The at least one flexible manipulating mechanism may include an end effector configured to manipulate an object. The end effector may further include a blunt surface configured to prevent damage to an object.

The apparatus may additionally include a first imaging device associated with the housing, the first imaging device configured to indicate a position of an object. The apparatus may also include a computing device configured to receive an imaging signal from the first imaging device and to direct the at least one manipulating mechanism towards the object based upon, at least in part, the imaging signal.

One or more of the following features may also be included. The apparatus may further include a second imaging device associated with the at least one flexible manipulating mechanism. The at least one flexible manipulating mechanism may be at least one of pneumatically extended and hydraulically extended. The apparatus may also include a plurality of imaging devices and a plurality of computing devices, the plurality of imaging devices and plurality of computing devices being arranged in a grid configuration within the housing.

In some embodiments, the at least one flexible manipulating mechanism may include a plurality of controlling cables configured to control direction of the at least one flexible manipulating mechanism through bending. The controlling cables may be contained within a hollow shaft. The plurality of controlling cables may include three controlling cables. The controlling cables may be flexible in nature. The flexible manipulating mechanism may be controlled using the plurality of controlling cables as the flexible manipulating mechanism is extended.

In some embodiments, the at least one manipulating mechanism may include at least one interlocking flexible component configured to control direction of the at least one flexible manipulating mechanism through bending. The manipulation mechanism may be configured to manipulate at least one additional object that interacts with the first object. The plurality of interlocking components may include three members connected to a single hub. The hub may be extruded having a hollow configuration.

In some embodiments, at least one force may be applied to the at least one interlocking component to steer the flexible manipulating mechanism through at least one of bending, shear, and tension. The computing device may control at least one of the interlocking flexible components based upon, at least in part, at least one of the velocity and the position of the object. The at least one interlocking flexible component may be configured to control a direction of the manipulating mechanism through at least one of bending, shear, and tension.

In some embodiments, the computing device may be configured to calculate at least one of a velocity and a position of the object. The computing device may control at least one of the plurality of controlling cables and/or interlocking members based upon, at least in part, at least one of the velocity and the position of the object. Further, the computing device may control at least one of a velocity and a position of the at least one manipulating mechanism.

In some embodiments, the computing device may be configured to calculate at least one of a velocity and a position of at least one manipulating mechanism. The computing device may control at least one of the plurality of controlling cables or members based upon, at least in part, at least one of the velocity and the position of the at least one manipulating mechanism.

In some embodiments, manipulating the object may include, at least one of, grasping, moving, operating, sawing, cutting, striking, hooking, pulling, picking and impacting the object. Manipulating may also include impacting at least one of an agricultural product and an environment of the agricultural product. The manipulating mechanism may be controlled using one or more controlling cables as the manipulating mechanism is extended. The manipulating mechanism may also include at least one interlocking flexible component configured to direct the manipulating mechanism. The manipulating mechanism may be configured to manipulate at least one additional object that interacts with the object.

In another implementation, a harvesting apparatus is provided. The harvesting apparatus may include a housing configured to include at least one flexible manipulating mechanism operatively connected with the housing, the at least one flexible manipulating mechanism including an end effector having a cutting surface. The harvesting apparatus may further include at least one forcibly actuated piston associated with the at least one flexible manipulating mechanism, the piston configured to deploy a portion of the at least one flexible manipulating mechanism upon receiving a control signal. In some embodiments, a plurality of imaging devices may be associated with the housing. The plurality of imaging devices may be configured to generate an imaging signal corresponding to an object. The harvesting apparatus may further include a computing device configured to receive the imaging signal from the plurality of imaging devices and to direct the end effector of the at least one flexible manipulating mechanism towards the object based upon, at least in part, at least one of the position and the velocity of the object, the computing device further configured to provide at least one mid-course correction to the at least one flexible manipulating mechanism after deployment. The control signal may be based upon, at least in part, the imaging signal.

In another implementation of this disclosure, a mobile harvesting system is provided. The mobile harvesting system may include an attachment mechanism configured to be attached to a vehicle, the attachment mechanism configured to contain a plurality of harvesting devices. Each of the plurality of harvesting devices may include a housing configured to include at least one flexible manipulating mechanism operatively connected with the housing, the at least one flexible manipulating mechanism including an end effector configured to manipulate an object. Each of the plurality of harvesting devices may also include a first imaging device associated with the housing, the first imaging device configured to indicate a position of an object. The mobile harvesting system may further include a computing system in communication with the plurality of harvesting devices, the computing system configured to receive an imaging signal from the first imaging device and to direct the at least one manipulating mechanism towards the object based upon, at least in part, the imaging signal.

The details of one or more implementations are set forth in the accompanying drawings and the description below. Other features and advantages will become apparent from the description, the drawings, and the claims.

BRIEF DESCRIPTION OF THE DRAWINGS

FIG. 11 is an exemplary embodiment of a manipulating mechanism associated with the robotic apparatus of the present disclosure;

Like reference symbols in the various drawings, in some cases, may indicate like elements.

DETAILED DESCRIPTION OF THE PREFERRED EMBODIMENTS

Generally, the present disclosure provides systems and apparatuses for manipulating an object. Specifically, in some embodiments the present disclosure may be used to identify the position and/or velocity of an object such as a piece of fruit and to subsequently manipulate the object. In some embodiments, the present disclosure may be used to identify the position and/or velocity of a manipulation mechanism. Although many of the embodiments described herein are discussed in the context of citrus fruit it is envisioned that the present disclosure may be applied in numerous other applications including agricultural products other than citrus fruit as well as objects other than agricultural products.

Figure 1:
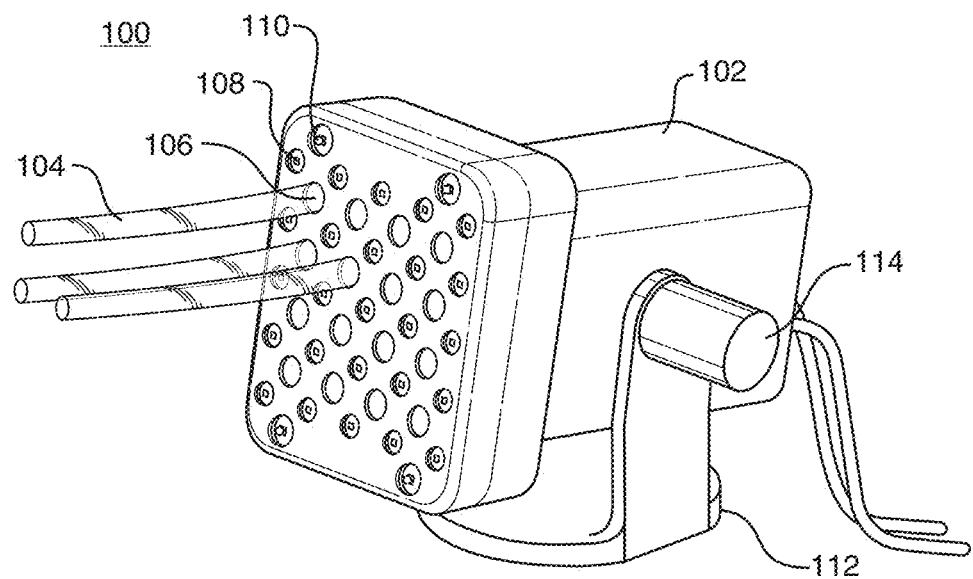
FIG. 1 is an exemplary embodiment of a robotic apparatus in accordance with the present disclosure.

Referring to FIG. 1, robotic apparatus 100 is provided in accordance with the present disclosure. As discussed above, robotic apparatus 100 may be used to manipulate objects, such as the manipulation required in the harvesting of fruit from citrus trees or the like.

In some embodiments, the term "manipulate", "manipulating", "manipulation" and the like, as used herein, may refer to any and all forms of grasping, pinching, squeezing, moving, operating, sawing, cutting, striking, hooking, pulling, picking, impacting, and/or any treatment of an object using mechanical devices. For example, "manipulating" may refer to cutting off an agricultural product, such as by severing the stem or removing the object from its stem by force. Additionally and/or alternatively "manipulating" may refer to impacting an agricultural product, its stem, its leaves, the ground beneath it, the plant supporting it, or any other related aspects of the environment of the agricultural product. "Manipulating" may also refer to striking an object to move, deform, and/or transform it.

In some embodiments, the present disclosure may be used to manipulate fruits or vegetables, including, but not limited to, the following: oranges, grapefruit, tangerines, lemons, other citrus fruits, grapes, apples, peaches, plums, pears, avocadoes, mangoes, bananas, pineapples, papaya fruit, berries, nuts, tomatoes, peppers, cucumbers, beans, carrots, onions, lettuce, peas, rutabaga, squash, melons, corn, grains, and tubers.

In some embodiments, apparatus 100 may include a housing 102 configured to include at least one manipulating mechanism 104. Housing 102 may be constructed out of a durable, rigid material, which may include, but is not limited to, various metals and/or plastics. Housing 102 may have a generally hollow interior portion, which may be configured to include a number of manipulating mechanisms 104, which will be described hereinbelow in greater detail. Housing 102 may also include a plurality of apertures 106 each of which may be configured to permit one or more manipulating mechanisms 104 to pass therethrough.

Housing 102 may further include one or more imaging devices configured to indicate a position of an object such as a piece of fruit. Imaging devices may be arranged in an array and may include both color vision cameras 108, which may be used for visual guidance and wider field of view cameras 110, which may be used for searching. The imaging devices may be positioned in any suitable configuration within housing 102. For example, in some embodiments, 25 color vision cameras 108 may be arranged in 5 rows of 5 cameras and 4 wider field of view cameras 110 may be positioned with two cameras at the top and two cameras at the bottom of housing 102. It should be noted that this arrangement is merely set forth as a possible configuration as numerous other configurations are also within the scope of the present disclosure.

As shown in FIG. 1, manipulating mechanisms 104 and imaging devices 108, 110 may be interlaced on the grid. The imaging devices may be fixed within housing 102. In some embodiments, the field of view of each narrow grid camera may be approximately 20°. The field of view of each wide search camera may be approximately 50°. In some embodiments, the imaging devices may be configured to move and/or rotate as instructed by one or more computing devices. An integrated lighting system may also be provided to support both day and night operation.

Housing 102 may be pivotally attached to a base portion 112. Base portion 112 may also be configured to rotate and/or move in addition to housing 112. As shown in FIG. 1, housing 102 may pivot about base portion 112 via pivot point 114, allowing for adjustment in a vertical dimension. Similarly, base portion 112 may rotate to allow for adjustment in a horizontal direction.

In some embodiments, manipulating mechanism 104 may be organized in a grid configuration such as that shown in FIG. 1. Multiple grids, each supporting a plurality of manipulating mechanisms (e.g., 16) may be used simultaneously. Manipulating mechanisms 104 may be disposable and/or easily attached and/or removed from housing 102. Manipulating mechanism 104 may include a pneumatic actuator located at its proximal end and an end effector located at its distal end. The end effector may include a cutting surface configured to cut the stem of the citrus fruit as will be discussed in further detail hereinbelow.

Figure 3A:
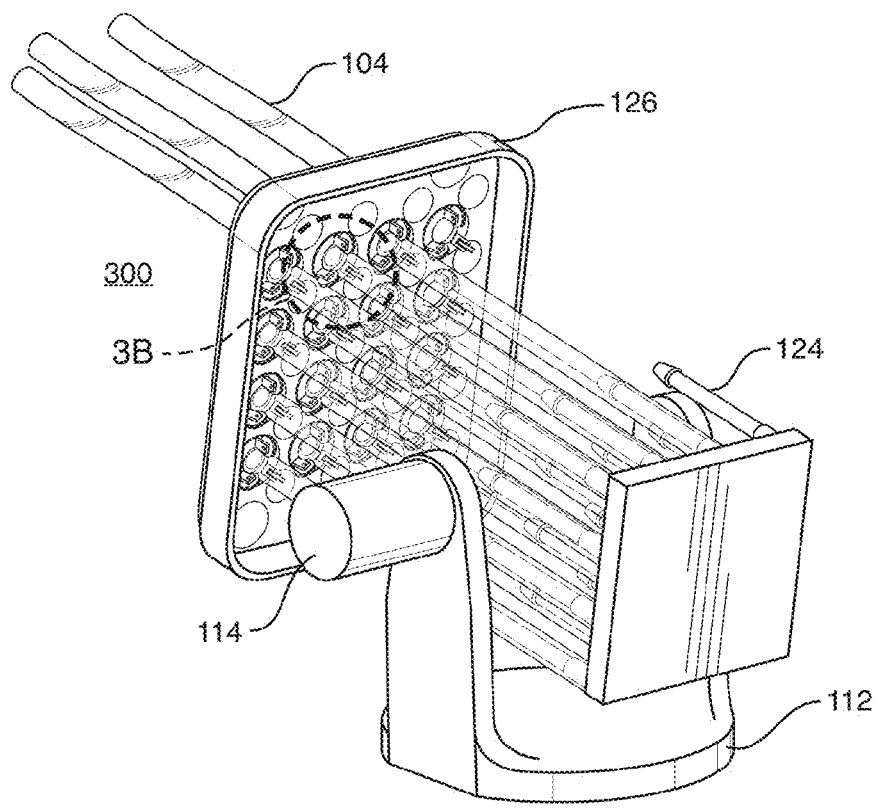
FIG. 3 is an exemplary embodiment of a robotic apparatus in accordance with the present disclosure.
Figure 3B:
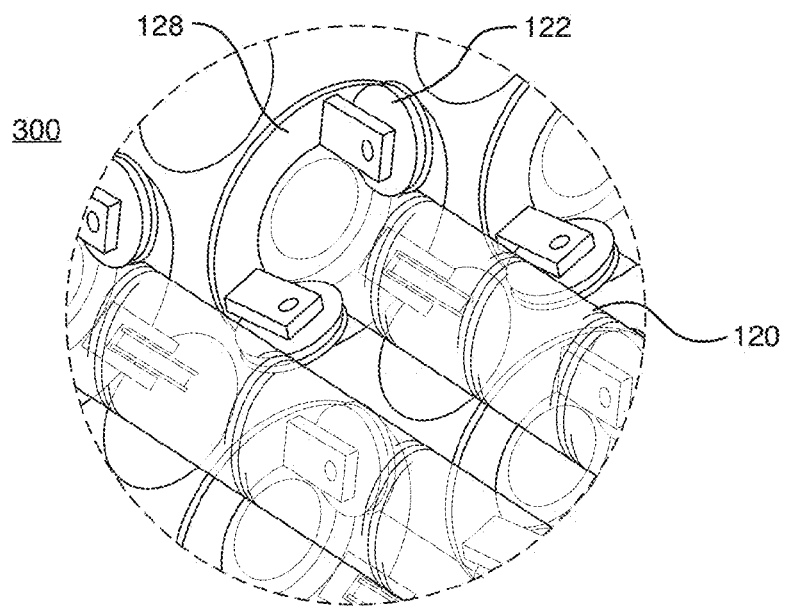
Figure 4:
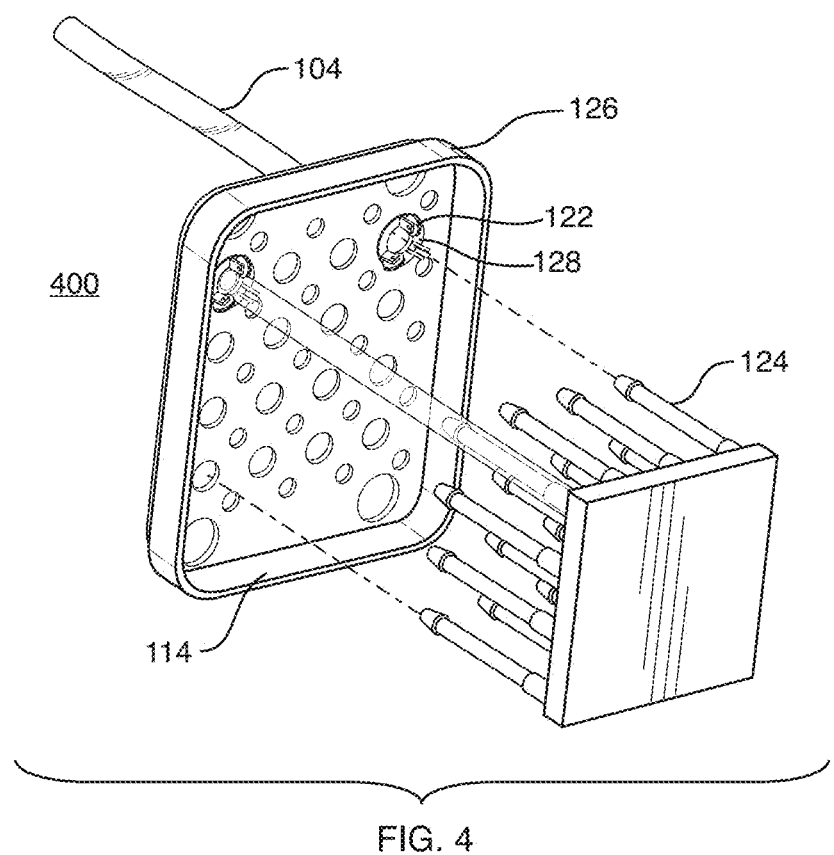
FIG. 4 is an exemplary embodiment of a robotic apparatus in accordance with the present disclosure.

Referring again to FIG. 1, each of the 16 manipulating mechanisms 104 may be flexible and may include three controlling wire cables that bend each manipulating mechanism in the direction of targeted fruit as it traverses a forward trajectory under pneumatic actuation. Thus, each manipulating mechanism 104 may include one active actuator (the pneumatic cylinder) and three passive actuators (the brakes on the self-retracting despooling cables), as illustrated in FIG. 3. These may actuate the three degrees of freedom of the cutting head. The distal end of each manipulating mechanism 104 may be flexible and controllable, while the proximal end may have a more rigid configuration. The action of each manipulating mechanism may be analogous to that of a frog's tongue. It should be noted that pneumatic actuators are merely provided for exemplary purposes as other forms of forcible actuation may also be employed, e.g., hydraulics.

In some embodiments, manipulating mechanism 104 may be constructed out of plasticized polyvinyl chloride tubing and may include three small tubes inserted into a larger tube. However, numerous other materials are also envisioned to be within the scope of the present disclosure. Each of the small tubes may be threaded with a braided wire cable or similar material. Pulling on any cable may bend each manipulating mechanism 104 in the direction of that cable (each direction may be offset from the other two by 120°). Any or all parts of manipulating mechanism 104 may be removable and/or replaceable. Manipulating mechanism 104 may also be constructed out of flexible interlocking members as is discussed in further detail in FIGS. 14-15.

Manipulating mechanisms 104 may have a flexible construction and may be of any suitable length. For example, in some embodiments, manipulating mechanism 104 may be approximately 5-6 feet in length. Each manipulating mechanism 104 may be extended using a pneumatic actuator and flexed under closed-loop visual servoing using three non-locking brakes attached to control cables. The stroke time may be approximately one second.

Figure 2A:
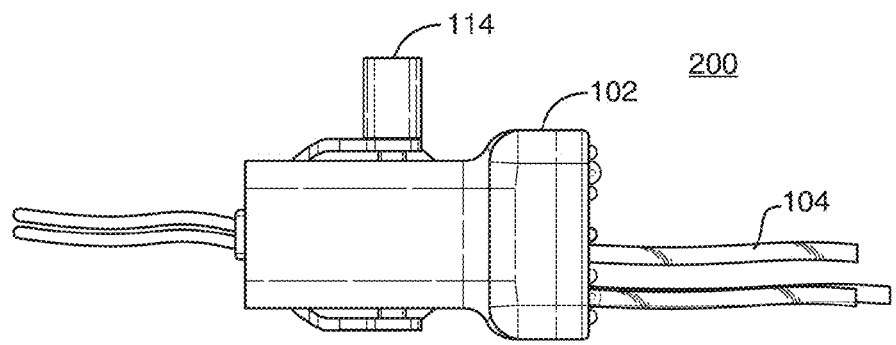
FIG. 2A is another exemplary embodiment depicting a top view of a robotic apparatus in accordance with the present disclosure.
Figure 2B:
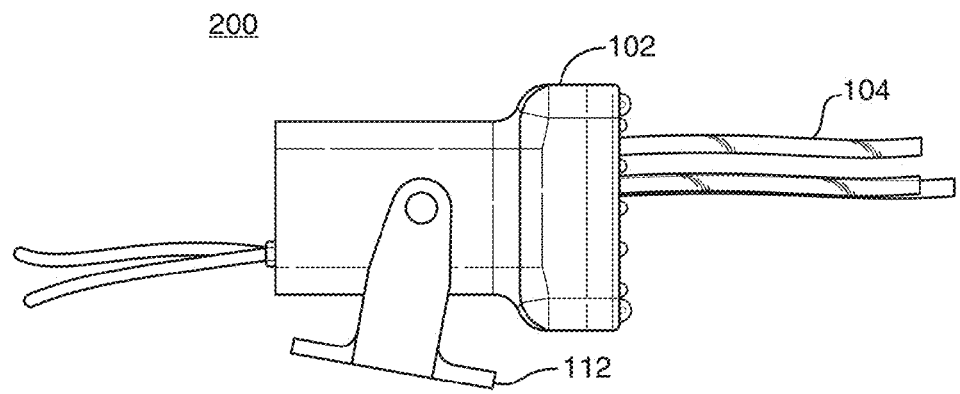
FIG. 2B is another exemplary embodiment depicting a side view of a robotic apparatus in accordance with the present disclosure.
Figure 2C:
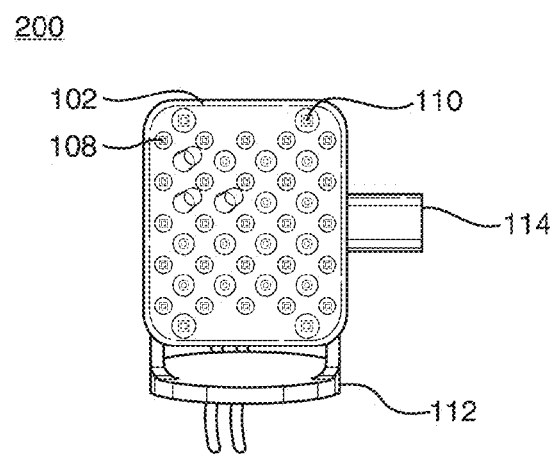
FIG. 2C is another exemplary embodiment depicting a front view of a robotic apparatus in accordance with the present disclosure.

Each of manipulating mechanism 104 may be guided by a computing device based upon feedback from imaging devices 108 and/or 110 as shown in FIGS. 1-2. Vision feedback may be combined with dead reckoning. Robotic apparatus 100 may be configured to guide each manipulating mechanism 104 to strike the stem of the object (e.g., fruit). In this way, multiple imaging devices (e.g., cameras) may be used to improve detection, measure the position of the fruit (e.g., three-dimensional), and measure the position of the manipulating mechanism head (e.g., three-dimensional). Top view, side view, and front views of robotic apparatus 100 are shown in FIGS. 2A, 2B, and 2C respectively.

Referring now to FIG. 3, an exemplary embodiment of robotic apparatus 300 is shown. Robotic apparatus 300 may include controlling cables 120 working in conjunction with pulleys 122. Controlling cables 120 may be affixed to the base portion of actuator 124. Manipulating mechanism 104 may extend through an aperture located in cover panel 126 of housing 102. Pulleys 122 may be affixed to pulley housing 128, which may be configured to mate with cover panel 126. Pulley housing 128 may have a circular configuration, however, numerous other configurations are also possible.

As discussed above, the imaging devices may provide visual information to one or more computing devices. Triangulation techniques may be used to identify the location of the object and/or the end effector of manipulating mechanism 104. The locations of the object (e.g., piece of fruit) and/or manipulating mechanism 104 may be used to control the brakes shown in FIG. 3 and guide the end effector of manipulating mechanism 104. Each camera may be configured to provide a unique view of the object. Thus providing improved identification in certain situations, such as when an object is obscured in one view but not in the other.

The computing devices associated with the present disclosure may include one or more integrated circuits configured to perform operations associated with robotic apparatus 100. The term "integrated circuit", as used in any embodiment herein, may refer to a semiconductor device and/or microelectronic device, such as, for example, but not limited to, a semiconductor integrated circuit chip. As used in any embodiment described herein, "circuitry" may comprise, for example, singly or in any combination, hardwired circuitry, programmable circuitry, state machine circuitry, and/or firmware that stores instructions executed by programmable circuitry. It should be understood that at the outset that any of the operations and/or operative components described in any embodiment herein may be implemented in software, firmware, hardwired circuitry and/or any combination thereof.

Figure 5A:
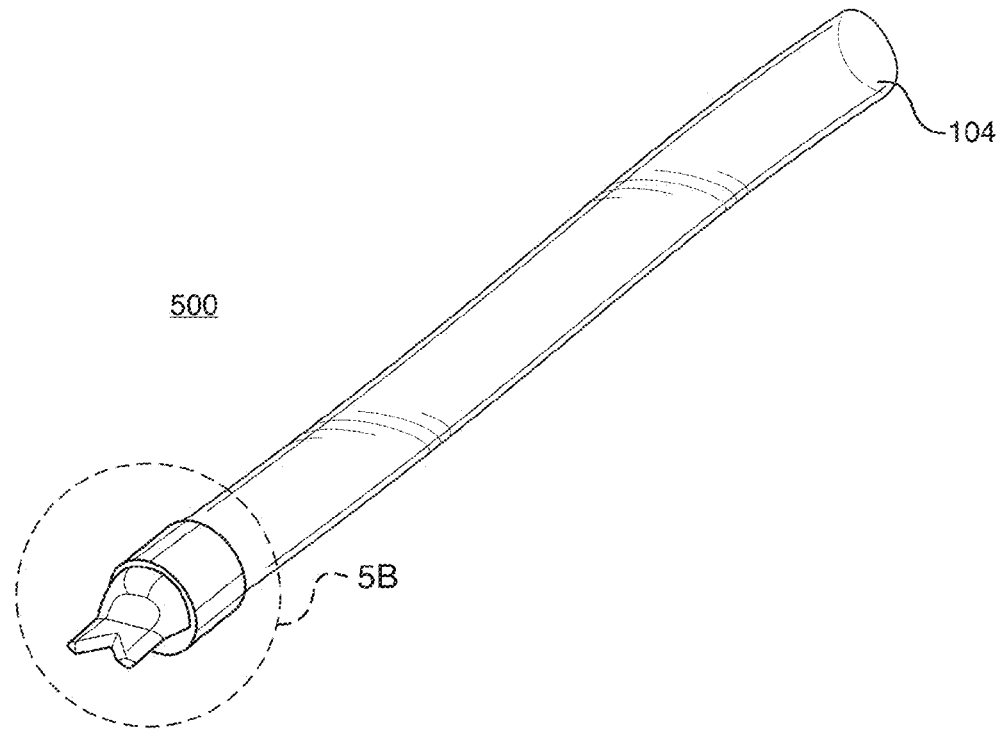
FIG. 5 is an exemplary embodiment of an end effector associated with the robotic apparatus of the present disclosure.
Figure 5B:
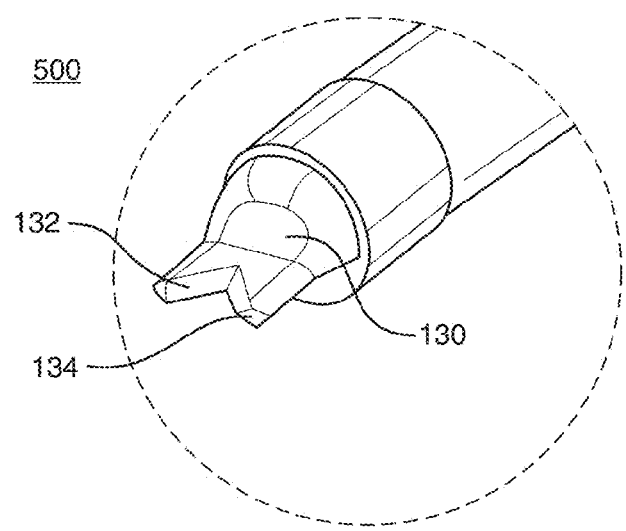

Referring now to FIG. 5, an embodiment of a manipulating mechanism 104 including an end effector 130 is shown. Each of manipulating mechanisms 104 may include the same or a variety of end-effector types. End effector 130 may include a cutting surface 132 and a blunt surface 134. Cutting surface 132 may be configured to cut the stem of a piece of fruit, and a blunt surface 134 may be configured to prevent damage to the object (e.g., piece of fruit) or the environment (e.g., the fruit tree). This configuration may allow end effector 130 to sever stems while sparing the fruit. End effector 130 may be detachable, which may prevent snagging on leaves and twigs. A cutting end-effector of this type is meant merely as a representative embodiment. Other end effectors could, for example, grasp, move, saw, cut, strike, hook, pull, etc.

Robotic apparatus 100 may further include one or more computing devices. In some embodiments, the computing device may be configured to receive an imaging signal from an imaging device (e.g., cameras 108, 110) and to direct one or more manipulating mechanisms 104 towards the object based upon, at least in part, the imaging signal. Moreover, the computing device may be configured to calculate both the velocity and position of the object as well as the velocity and position of manipulating mechanism 104. The computing device may be constructed to withstand adverse environmental conditions, including extreme temperatures, humidity, dirt, and vibration, which may provide increased durability in harsh environments. The computing device may be located within housing 102 or at a remote location, accessible via wireless communication techniques known in the art.

In some embodiments, the computing device may be configured to control any and/or all portions of robotic apparatus 100. For example, in some embodiments, the image processing associated with imaging devices 108, 110 may require one central processing unit (CPU) and one graphical processing unit (GPU) for each row of cameras. In addition, one CPU may be associated with each row of manipulating mechanisms 104, and three CPUs may be used for grid coordination and interfacing, including processing the imagery from wide field of view cameras 110. Each CPU may be stand-alone or, more likely, one core on a multi-core processor.

In some embodiments, the computing device may provide mid-course corrections to adjust at least one of the position and orientation of one or more of the manipulating mechanisms 104. These mid-course corrections may occur at the time of, as well as after, deployment of manipulating mechanisms 104 from housing 102. The mid-course corrections may be based upon the data received from the imaging devices, which may be used to indicate the position and/or velocity of the object and/or manipulating mechanism.

Figure 6:
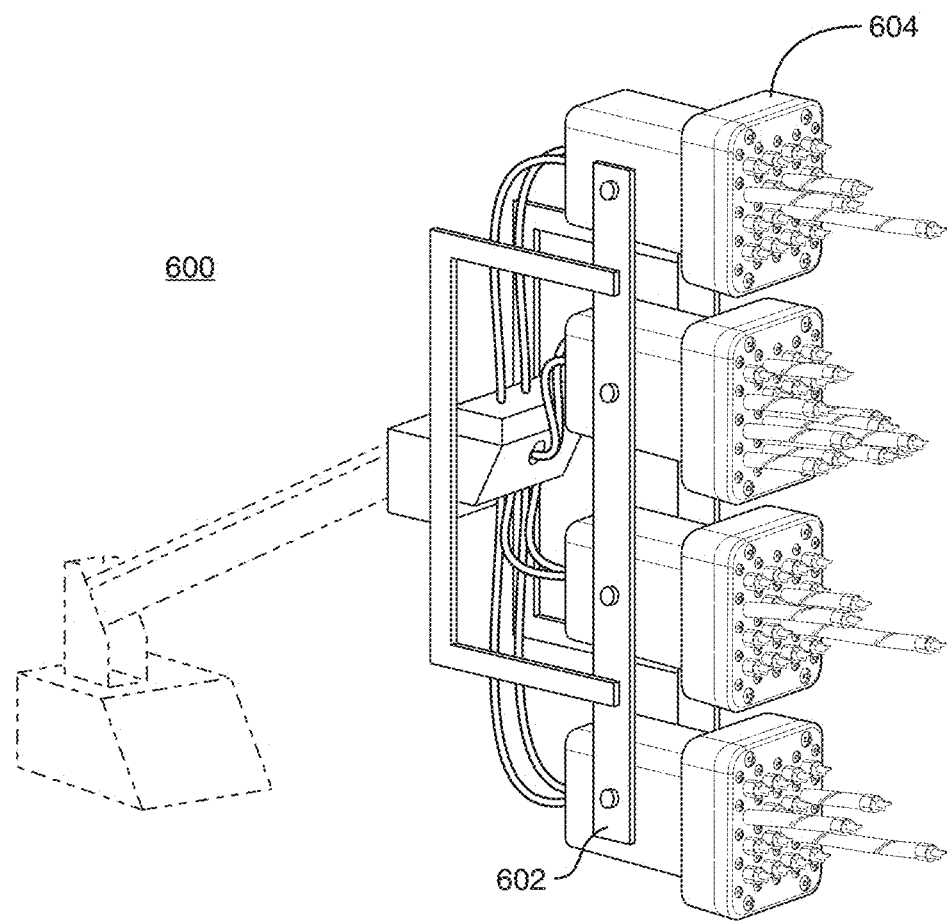
FIG. 6 is an exemplary embodiment of a mobile harvesting system associated with the present disclosure.

Referring now to FIG. 6, in some embodiments, robotic apparatus 100 may be included within a mobile harvesting system 600. Mobile harvesting system 600 may include attachment mechanism 602, which may be configured to be attached to a vehicle or a towable unit such as a trailer. Attachment mechanism 602 may be configured to contain and/or house a number of harvesting devices 604 such as robotic apparatus 100 described above with reference to FIGS. 1-5. In some embodiments, harvesting system 600 may include four harvesting devices 604 as shown in FIG. 6, giving a total computational requirement of approximately 48 CPUs or cores and 20 GPUs. Multi-core microprocessors may be used in order to minimize cost.

In some embodiments, manipulating mechanisms 104 of robotic apparatus 100 may operate in conjunction with one or more kinematic control algorithms. For example, harvesting system 600 may include four harvesting devices, each with six degrees of freedom in movement and each containing 16 manipulating mechanisms 104. Each mechanism may have three effective degrees of freedom, forming a 216 degree of freedom robotic system.

In some embodiments, efficient, coordinated control of robotic apparatus 100 and/or harvesting system 600 may be provided using the following velocity-control framework, which may be based upon, at least in part, the Jacobian equation:

$$V = J(q)\dot{q},$$

where V is an m-length vector representation of the motion of the end effectors (the 3D picking head locations); q is the vector of manipulating mechanism configuration parameters and J is the m×n Jacobian, a function of q. Building on the method described in (English, J. D. and Maciejewski, A. A., (2000) "*On the Implementation of Velocity Control for Kinematically Redundant Manipulators*," IEEE Transactions on Sys., Man, and Cybernetics—part A: Systems and Humans, vol. 30, no. 3, pp. 233-237), the control framework solves this equation using a scalar α, a matrix function W(q), and a vector function F(q) as follows:

$$\dot{q} = \begin{bmatrix} J \\ N_J^T W \end{bmatrix}^{-1} \begin{bmatrix} V \\ -\alpha N_J^T F \end{bmatrix}. \quad (2)$$

Here, $N_J$ is an n×(n−m) set of vectors that spans the null space of J. By just changing the values of α, W, and F(q), powerful velocity-control techniques may be implemented. These may be used to optimize collision avoidance and harvesting efficiency.

In some embodiments, digital simulation may be performed for both robotic apparatus 100 as well as for the citrus tree. For example, to create the simulation, the Articulated Body Inertia Algorithm (see generally, Featherstone, R., (1987) *Robot Dynamics Algorithms*, Kluwer Academic Publishers, Boston; and Lilly, K. W., (1993) *Efficient Dynamic Simulation of Robotic Mechanisms*, Kluwer Academic Publishers, Boston) may be used for modeling robotic apparatus 100, and the Composite Rigid-Body Inertia Algorithm (see generally, Walker, M. W., and Orin, D. E., (1982) "*Efficient Dynamic Computer Simulation of Robotic Mechanisms*," Journal of Dynamic Systems, Measurement, and Control, 104, pp. 205-211; and Fijany, A., and Bejczy, A. K., (1990) "*An Efficient Algorithm for Computation of Manipulator Inertia Matrix*," Journal of Robotic Systems, 7(1), 57-80) may be used for modeling the fruit and tree.

Substantial research has been done on the general task of visually discriminating objects such as citrus fruit on the tree (Canny, J., (1986) "*A Computational Approach to Edge Detection*, IEEE Transactions on Pattern Analysis and Machine Intelligence, vol. PAMI-8, no. 6, November, pp. 679-698; and Pal, N. R., and Pal, S. K., (1993) "*A Review on Image Segmentation Techniques*," Pattern Recognition, vol. 26, no. 9, pp. 1277-1294; and Worthington, P. L., and Hancock, E. R., (2001) "*Object Recognition Using Shape-from-Shading*, IEEE Transactions on Pattern Analysis and Machine Intelligence, vol. 23, no. 5, May, pp. 535-542) and specific work has been done for citrus identification (Weeks, A. R., Gallagher, A., and Eriksson, J., (1999) "*Detection of Oranges from a Color Image of an Orange Tree*," Proceedings of SPIE—Volume 3808, Applications of Digital Image Processing XXII, October, pp. 346-357; Plebe, A., and Grasso, G., (2001) "*Localization of Spherical Fruits for Robotic Harvesting*," Machine Vision and Applications, 13; pp. 70-79; and Annamalai, P., Lee, W. S., and Burks, T. F., (2004) "*Color*

Vision System for Estimating Citrus Yield in Real-Time," ASAE/CSAE Annual International Meeting, Ottawa, August 1-4).

For expertise in the area of vision for identification of citrus fruits, Vision Robotics Corporation of San Diego, Calif. has created and field-validated vision systems for identifying citrus. In some embodiments, the present disclosure may incorporate the citrus-specific techniques of Vision Robotics with general three dimensional vision methods developed by the Assignee of the present invention for analyzing three dimensional object occlusion, shape, and movement. Other machine vision techniques may also be used.

Figure 7:
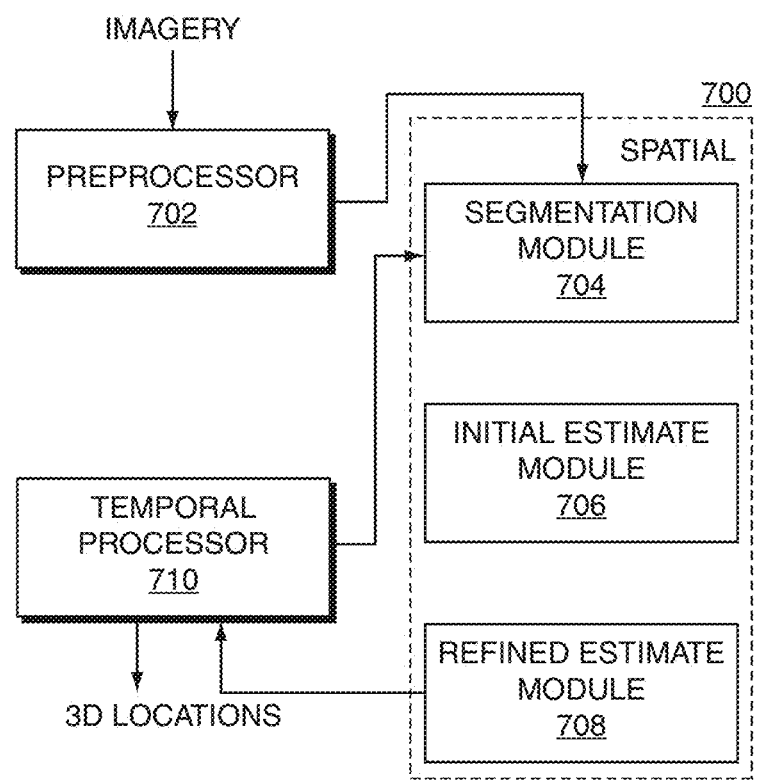
FIG. 7 is a block diagram of a vision system associated with the robotic apparatus of the present disclosure.

Referring now to FIG. 7 one exemplary embodiment of vision system 700 of associated with robotic apparatus is provided. Imagery from the various imaging devices associated with the grid of robotic apparatus 100 may be input to preprocessor 702. Preprocessor 702 may be configured to reduce the effects of camera artifacts, such as fixed-pattern noise and pixel errors. Preprocessor 702 may also eliminate information-bearing components, such as motion blur, provided the fruit identification and tracking algorithms do not use them.

In some embodiments, processing may include a number of spatial modules that analyze imagery. These modules may include, but are not limited to, segmentation module 704, initial estimate module 706, and refined estimate module 708. Some of these modules may perform frame by frame analysis. Temporal processor 710 may also be included within vision system 700, which may combine observations over time. The output from temporal module 710 may include the identification and three dimensional locations of the fruit and/or manipulating mechanisms 104.

Segmentation module 704 may be configured to isolate the pixels that represent the fruit and manipulating mechanisms. For this effort, techniques utilized by the assignee of the present disclosure may be combined with Vision Robotics' citrus-specific techniques to ensure that all pixels indicating citrus are found. To reduce computation time, segmentation module 704 may search in patterns that are set using information that may be fed back from temporal processor 710. After select pixels on fruit and manipulating mechanisms are found through search, they may be grouped and blobbed in order to convert a camera image into a segmented image.

In some embodiments, after the image or images have been segmented, initial estimate module 706 may be used to generate initial estimates of fruit and manipulating mechanism location using texture analysis, shape analysis, and/or triangulation across multiple imaging devices. Multiple hypotheses may be returned from initial estimate module 706, each of which may be used to construct refined estimates.

Figure 8A:
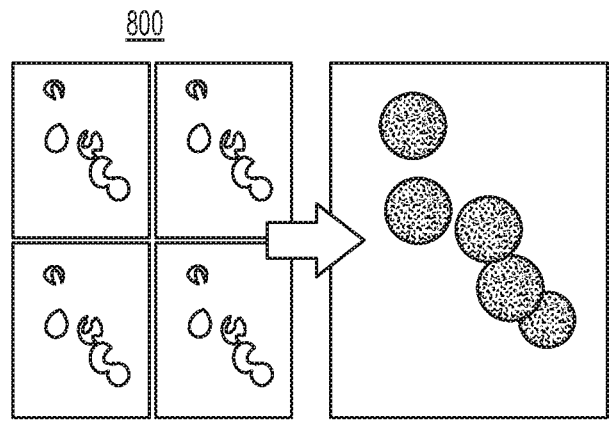
FIG. 8A is diagram showing an initial estimate of object size and location associated with the robotic apparatus of the present disclosure.

Referring now to FIG. 8A, a portion of this process is depicted. Segmented images from multiple cameras may be used to create an initial estimate of fruit and manipulating mechanism location. Making an initial estimate of the scene may be a difficult, global problem. To compensate for this difficulty, the results returned may be approximate, with few details and low accuracy.

Figure 8B:
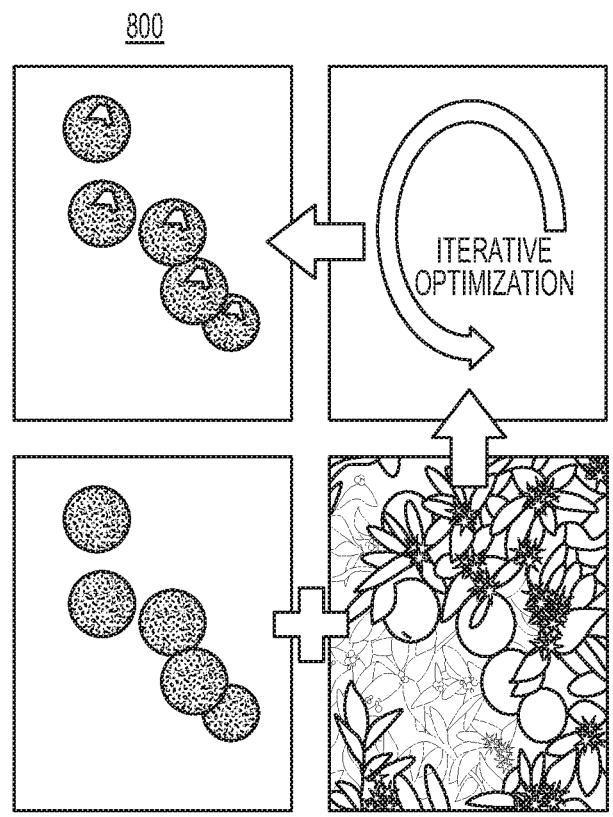
FIG. 8B is a diagram showing a refined estimate of object size and location associated with the robotic apparatus of the present disclosure.

Referring now to FIGS. 7 and 8B, refined estimate module 708 may refine the initial estimate from initial estimate module 706. Using original imagery (from multiple imaging devices) and the rough estimates provided by the initial estimation module 706, an optimization process may compare the original images with rendered synthetic images that may be parameterized by the location and shape of fruit and harvesting mechanisms in the scene (only fruit is shown here). An iterative optimization process may yield the best estimates, which may be used to control portions of robotic apparatus 100 and/or harvesting system 600. Refined estimate module 708, illustrated in FIG. 8B, may use iterative optimization with model-based methods. For example, local optimization may be applied to a set of parameters defining the location, shape, and orientation of fruit and manipulating mechanism 104 in the scene. The optimization process may then make use of graphical processing units (GPUs), which may be found, for example, in PC graphics cards. For three dimensional calculations, GPUs may be up to 100 times faster than Central Processing Units (CPUs), giving very high performance to this stage of the algorithm.

In some embodiments, preprocessor 702, segmentation module 704, initial estimation module 705 and refined estimation module 708 may all function to address the various ways that one set of imagery at a single time point may be analyzed. Referring again to FIG. 7, these results may be combined and improved over time using temporal processing algorithms, as implemented in the temporal module 710. To correlate information from one time step to another, a three dimensional version of Multiple Hypothesis Tracking (MHT) that has been developed for robotic and military applications may be used. MHT may provide accurate tracking results through bundling and scoring tracks.

There are two broad classes of MHT implementations: hypothesis centered and track centered. The original MHT algorithm proposed by Reid (Reid, D. B., (1979) "*An Algorithm for Tracking Multiple Targets*," IEEE Transactions on Automatic Control, AC-24(6), pp. 843-854, December) was hypothesis centric. Hypotheses were scored and propagated, and track scores were calculated from existing hypothesis. Track-centric algorithms, such as those proposed by Kurien (Kurien, T., (1990) "*Issues in the Design of Practical Multitarget Tracking Algorithms,*" Multitarget-Multisensor Tracking: Advanced Applications, Y Bar-Shalom Editor, Artech House), score and propagate tracks and calculate hypothesis scores from the track scores. The present disclosure extends these using the rich spatial detail provided by the three dimensional spatial algorithms discussed earlier. In the present disclosure, traditional MHT, which may apply to a collection of point values, may be extended to apply to rich three-dimensional information, such as in the representation of a scene containing both fruit and picking mechanisms 104.

In some embodiments, manipulating mechanism 104 may be constructed to be approximately 1 to 1.5 meters in length and may have a deployment and retraction of greater than 4 Hz. These examples are merely provided for the purpose of example as numerous other lengths and frequencies may be used as well. In some embodiments, manipulating mechanism 104 may effectively operate for approximately 50,000 cycles and may provide freedom from tangling with orange tree branches.

Figure 9:
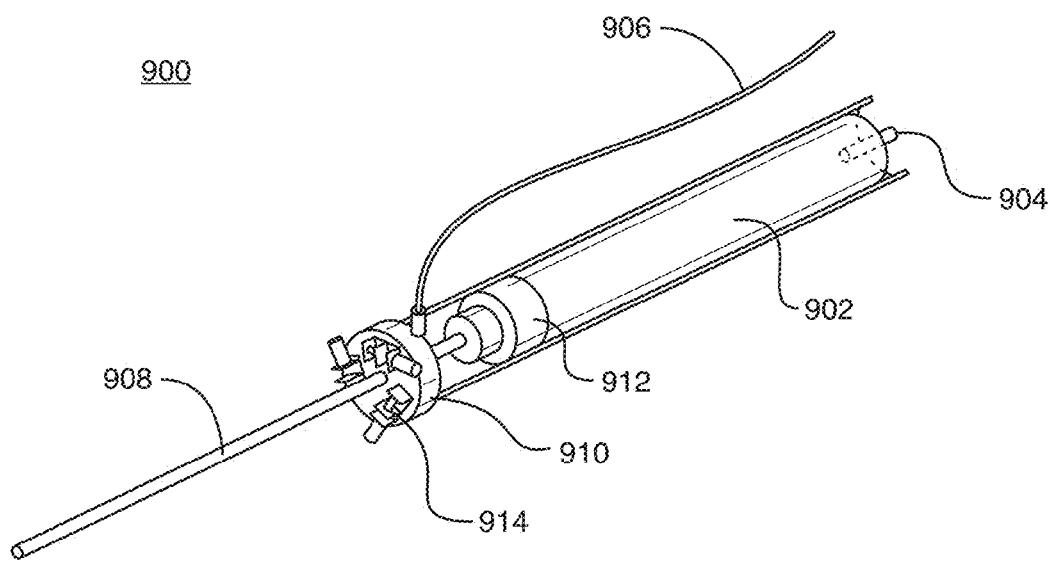
FIG. 9 is an exemplary embodiment of a manipulating mechanism associated with the robotic apparatus of the present disclosure.

Referring now to FIG. 9, an exemplary embodiment of manipulating mechanism 900 is shown. Manipulating mechanism 900 may include a hollow shaft or tube 902, which may include inlet port 904 and outlet port 906. In some embodiments, tube 902 may be an acrylic transparent or semi-transparent tube, however, tube 902 may be constructed out of any number of suitable materials. Inlet port 904 and outlet port 906 may be configured to permit air to pass therethrough. In this way, air pressure may be used for extending and/or contracting extendable piston rod 908.

In some embodiments, extendable piston rod 908 may be operatively connected to piston 912 via a clamp included within tube 902. Extendable piston rod 908 may pass through an aperture in pulley assembly 910 as it extends and/or contracts in reaction to changes in the air pressure within tube 902. More specifically, the air pressure may act on the area of piston 912 and move it up or down piston tube 902, depending upon which of inlets 904, 906 are active, and as a result extendable piston rod 908 may be extended and/or contracted.

Figure 12:
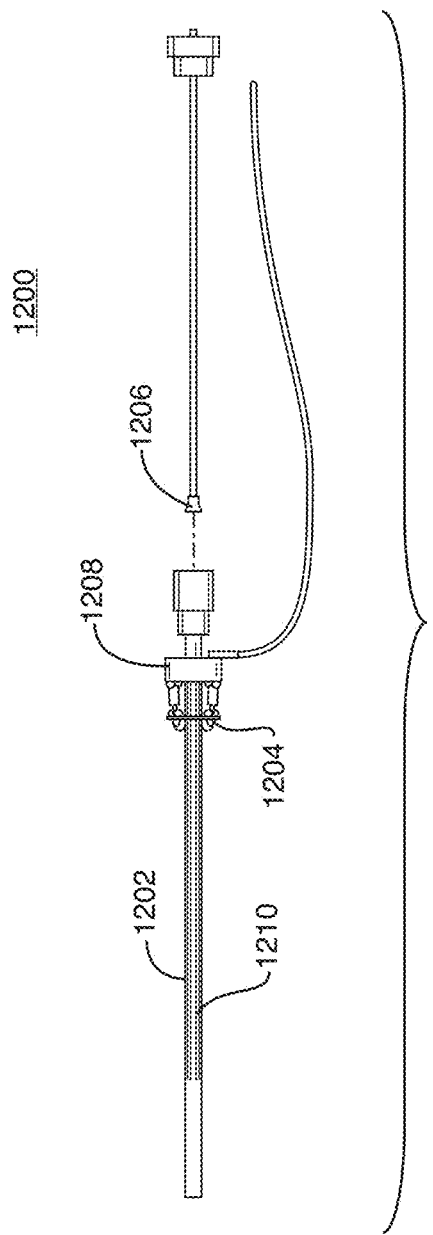
FIG. 12 is an exemplary embodiment of a manipulating mechanism associated with the robotic apparatus of the present disclosure.
Figure 13:
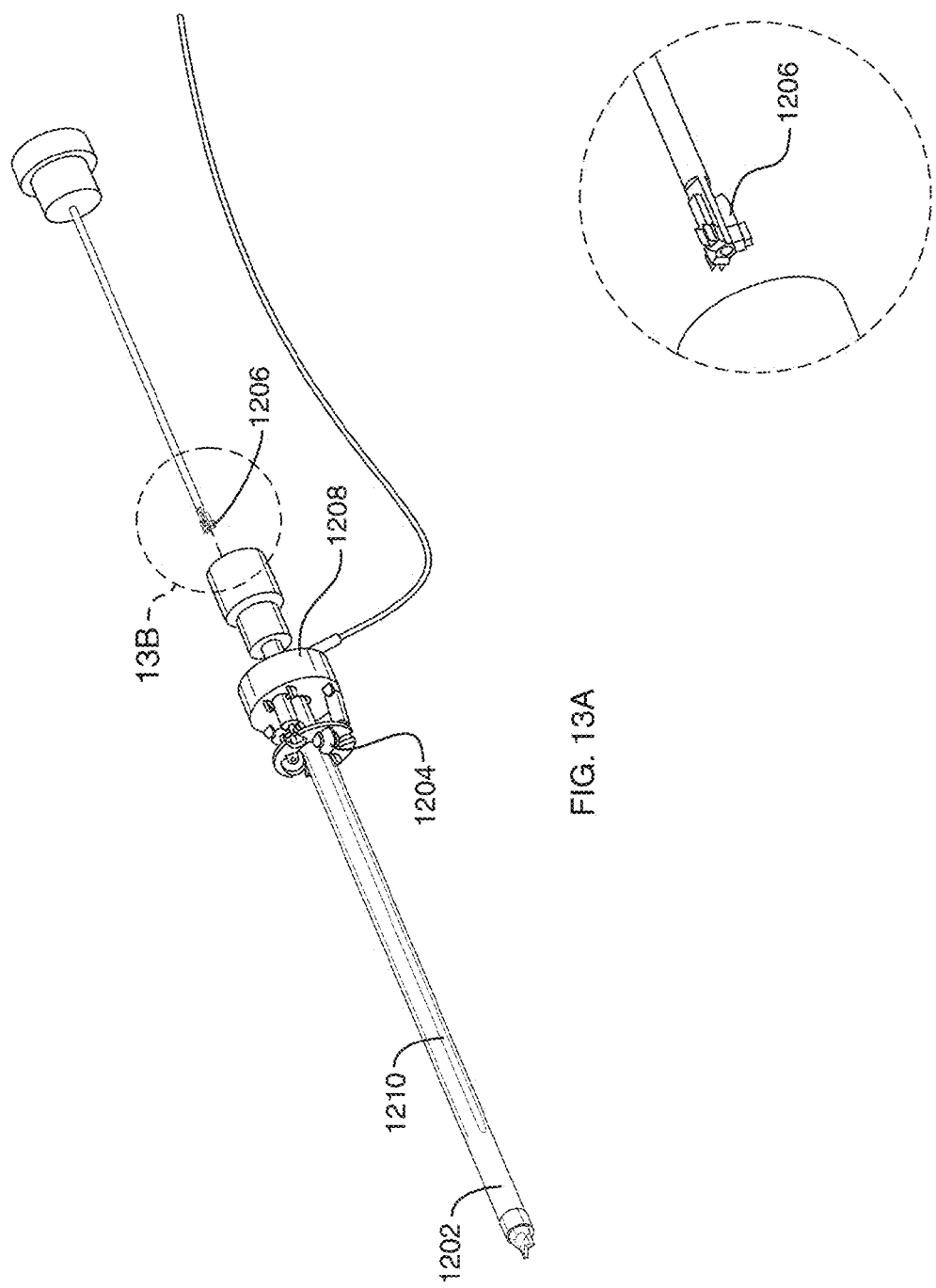
FIG. 13 is an exemplary embodiment of a manipulating mechanism associated with the robotic apparatus of the present disclosure.

Extendable piston rod 908 may be made of a variety of different materials. For example, in some embodiments, rod 908 may be constructed out of a medium stiffness plastic, which may be connected by a clamp to piston 912. In order to achieve deflections at the tip of extendable piston rod 908 as it is being extended (for real-time heading corrections) tension may be applied using three controlling cables (not shown in FIG. 9) operatively connected with pulley assembly 910. The controlling cables may be placed approximately 120 degrees around the external surface of extendable piston rod 908. The controlling cables may be controlled by the computing device based upon one or more of the velocity and the position of the object. Alternatively and/or additionally the controlling cables may be controlled based upon the velocity and/or position of the piston rod 908. The controlling cables are depicted in FIGS. 11-13 described in further detail below.

In some embodiments, the controlling cables may be attached close or at the very tip of the distal end of extendable piston rod 908, and to a pulley 914 at the proximal end. A motor may be associated with pulley assembly 910 that may be configured to control the tension on each pulley 914. The motor may be in communication with computing device and, as such, may be configured to receive instructions indicating the desired tensile force at pulley assembly 910. Sensors may be incorporated into pulley assembly 910 to provide feedback to the computing device. As extendable piston rod 908 is being extended, the controlling cables may provide little or no tension, but to achieve a desired extension length and/or tip deflection each of the pulleys 914 may be activated to provide the required tensions.

Figure 10A:
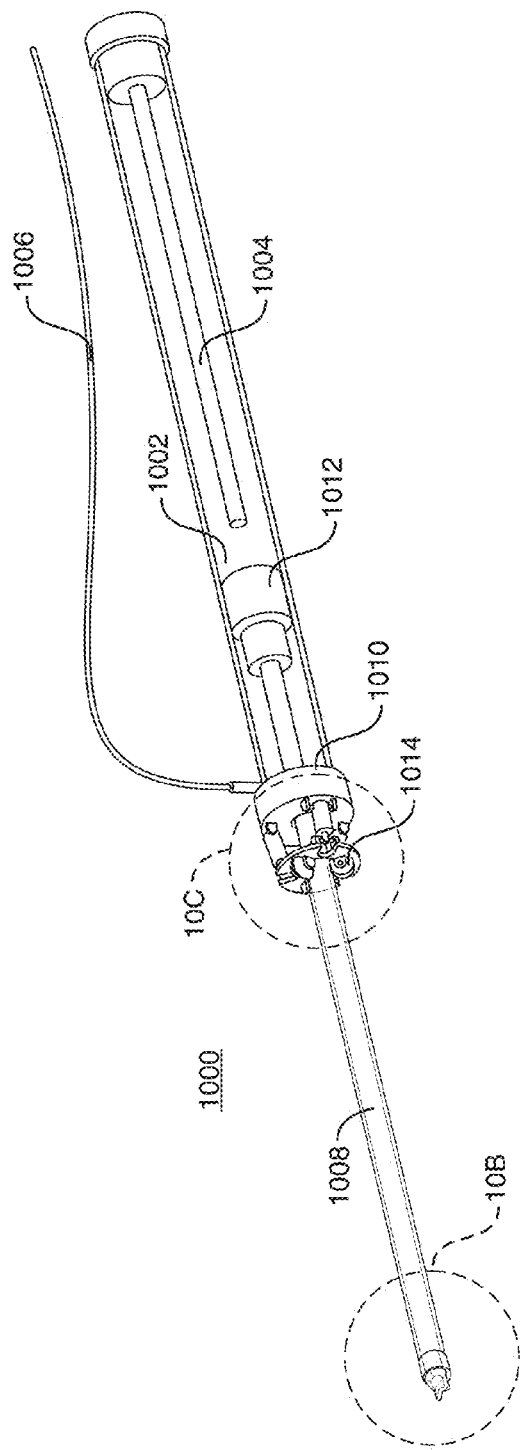
FIG. 10 is an exemplary embodiment of a manipulating mechanism associated with the robotic apparatus of the present disclosure.
Figure 10C:
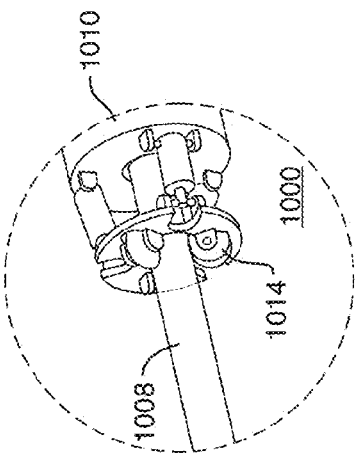
Figure 10B:
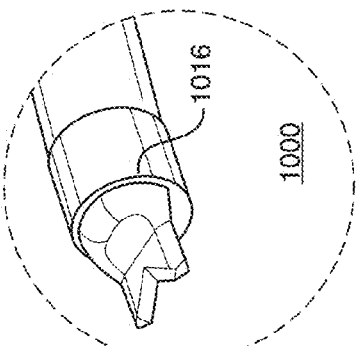

Referring now to FIG. 10, another exemplary embodiment of manipulating mechanism 1000 is provided. Manipulating mechanism 1000 may include tube 1002, which may include inlet port 1004 and outlet port 1006. In some embodiments, tube 1002 may be an acrylic transparent or semi-transparent tube, however, tube 1002 may be constructed out of any number of suitable materials. Inlet port 1004 and outlet port 1006 may be configured to permit air to pass therethrough. In this way, air pressure may be used for extending and/or contracting extendable piston rod 1008.

Manipulating mechanism 1000 may further include pulley assembly 1010, which may be configured to eliminate the use of the controlling cables outside of extendable piston rod 1008. In order to achieve real-time deflection of end effector 1016, a multiple degree of freedom steerable base, associated with pulley assembly 1010, may also be included. In this embodiment, extendable piston rod 1008 may be made of a flexible hollow tube and the air pressure used for extension may now act at the back of a heavy cutting tip placed at the distal end of end effector 1016. In this way, inlet port 1004 may have an internal extension whose tip sits right behind the heavy cutting tip of end effector 1016 when extendable piston rod 1008 is retracted. The return actuation may continue to utilize air pressure acting at the face of piston 1012.

In some embodiments, as extendable piston rod 1008 is extended out of the piston the three degree of freedom base stage may alter the orientation of extendable piston rod 1008, forcing rod 1008 to deflect as it comes out of piston tube 1002. The base deflection may allow the assignment of an initial heading for extendable piston rod 1008. This design eliminates any possible danger inherent in placing the controlling cables outside of extendable piston rod 1008. In some embodiments, portions of the manipulating mechanism such as the extendable piston mechanisms may be pivoted at the base, giving one or more degrees of freedom in motion.

Referring now to FIG. 11, another exemplary embodiment of manipulating mechanism 1100 is provided. Manipulating mechanism 1100 may include tube 1102, which may include inlet port and outlet port as discussed above. The ports may be configured to permit air to pass therethrough for extending and/or contracting extendable piston rod.

Manipulating mechanism 1100 may further include rollers 1104 and grippers 1106 included within assembly 1108. Manipulating mechanism may further include controlling cables 1110, which may be fixed outside of the extendable piston rod. Controlling cables 1110 may be used to control the orientation and/or direction of the extendable piston rod. In some embodiments, three controlling cables may be used, however, alternative configurations are also within the scope of the present disclosure. Manipulating mechanism 104 may include tip deflection control of approximately +/−10 cm at the tip of the end effector.

The embodiment shown in FIG. 11 is similar to that shown and described in FIG. 10, however no pulleys are used. In some embodiments, grippers 1106 may be associated with the three degree of freedom base stage. In this way, as the piston rod is being extended, the grippers may grab on to their respective controlling cable 1110 to generate tension to stop the controlling cables 1110 and/or deflect the tip of the end effector. This configuration is similar to that shown in FIG. 9, however, no pulleys are used. This allows greater controllability of the piston rod tip deflections.

Referring now to FIG. 12-13, another embodiment of manipulating mechanism 1200 is provided. Manipulating mechanism 1200 may include a number of components previously described, including, but not limited to, extendable piston rod 1202 and rollers 1204. Manipulating mechanism 1200 may also include controlling cables 1210 and gripper mechanisms placed inside extendable piston rod 1202 in order to remove the threat of tangling controlling cables 1210. FIG. 12 shows the internal mechanisms of extendable piston rod 1202 (the piston cylinder is not shown for clarity). The three grippers 1206 may now be placed at the tip of the internal inlet extension. The three fixed length cables 1210 may run inside the inner diameter of extendable piston rod 1202 and may be rigidly attached at the proximal and distal ends of extendable piston rod 1202. As extendable piston rod 1202 is expanded, controlling cables 1210 may run close to the internal so that these can easily grab on to them when needed to provide tension.

FIG. 13 shows additional details of the internal grippers 1206. In some embodiments, manipulating mechanism 1200, 1300 may include automatically adjustable range, tip control, and speed capabilities. The use of pneumatics may be applied to provide great power for extension and contraction of extendable piston rod 1202. In some embodiments, the theoretical duty cycles are well above 30 Hz. In addition, the present design allows for a very easy replacement and service of extendable piston rod 1202. Any or all of the components of the manipulating mechanisms described herein may be removable and/or replaceable.

In some embodiments, the at least one manipulating mechanism may include a plurality of interlocking flexible members configured to control direction of the at least one manipulating mechanism. These interlocking components may slide relative to each other to bend the at least one manipulating device. The plurality of interlocking members may include three members connected to a central hub. In some embodiments, the at least one manipulating mechanism may rotate or translate along one or more degrees of freedom at the base to direct the motion of the manipulator.

Figure 14:
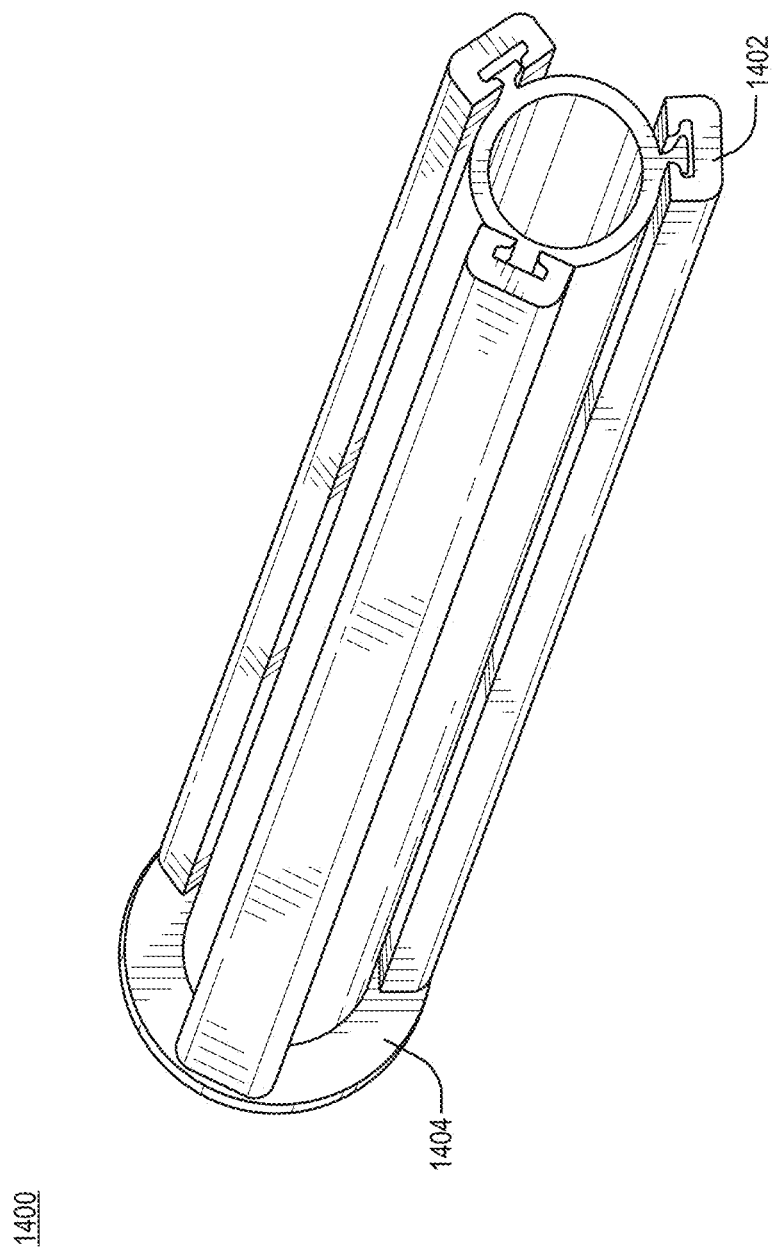
FIG. 14 is an exemplary embodiment of an interlocking flexible component associated with the robotic apparatus of the present disclosure.
Figure 15:
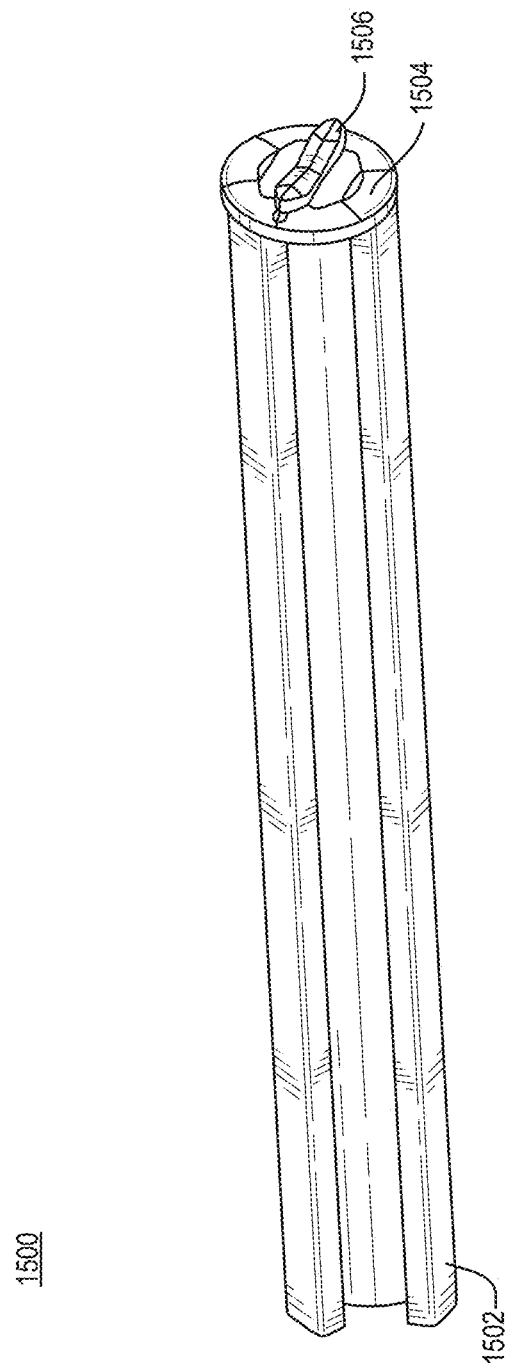
FIG. 15 is an exemplary embodiment of an interlocking flexible component associated with the robotic apparatus of the present disclosure.

Referring now to FIGS. 14-15, an embodiment of an extendable mechanism having interlocking flexible members is shown. Extendable mechanism 1400 may include an interlocking flexible component (e.g. ziplock-type) that may be used to direct manipulating mechanism. The interlocking flexible component may extend along mechanism 1400 in a substantially parallel direction. Exterior member 1402 of interlocking flexible component may be configured to mate with a corresponding portion of extendable mechanism 1400 and may reach a point adjacent end effector 1404. FIG. 15 includes a side view of the embodiment of the extendable mechanism shown in FIG. 14. Extendable mechanism 1500 may include exterior member 1502, end effector 1504 and cutting mechanism 1506.

In some embodiments, the manipulating mechanisms described herein may include an imaging device associated therewith. For example, a camera, such as cameras 108 and 110 shown in FIG. 1, may be included at the distal end of the extendable piston rod or other portions of the manipulating mechanism. This imaging device may be in communication with the computing system described hereinabove to provide imaging data (e.g. of fruit locations, color, etc).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A number of implementations have been described. Nevertheless, it will be understood that various modifications may be made. Accordingly, other implementations are within the scope of the following claims.

What is claimed is:

1. An apparatus comprising:
a plurality of housings each configured to include a plurality of continuously flexible and extendable manipulating mechanisms operatively connected with the housing, the plurality of flexible manipulating mechanisms each including an end effector configured to strike a stem associated with a fruit or vegetable;
a first imaging device associated with the plurality of housings, the first imaging device configured to indicate a position of the fruit or vegetable; and
a computing device configured to receive an imaging signal from the first imaging device and to direct at least one of the plurality of flexible manipulating mechanisms towards the fruit or vegetable based upon, at least in part, the imaging signal wherein the computing device is configured to calculate a velocity and a position of the fruit or vegetable.

2. The apparatus of claim 1, further comprising a second imaging device connected to the at least one flexible manipulating mechanism.

3. The apparatus of claim 1, wherein the at least one flexible manipulating mechanism is at least one of pneumatically extended and hydraulically extended.

4. The apparatus of claim 1, wherein the at least one manipulating mechanism includes a plurality of imaging devices and the computing device is one of a plurality of computing devices, the plurality of imaging devices and plurality of computing devices being arranged in a grid configuration within the housing.

5. The apparatus of claim 1, wherein the at least one flexible manipulating mechanism includes a plurality of controlling cables configured to control direction of the at least one flexible manipulating mechanism through bending.

6. The apparatus of claim 5, wherein the at least one flexible manipulating mechanism includes a hollow shaft configured to contain the plurality of controlling cables.

7. The apparatus of claim 6, wherein the plurality of controlling cables are flexible.

8. The apparatus of claim 6, wherein the plurality of controlling cables includes three controlling cables.

9. The apparatus of claim 5, wherein the computing device controls at least one of the plurality of controlling cables based upon, at least in part, at least one of the velocity and the position of the fruit or vegetable.

10. The apparatus of claim 5, wherein the flexible manipulating mechanism is controlled using the plurality of controlling cables as the flexible manipulating mechanism is extended.

11. The apparatus of claim 1, wherein the computing device controls at least one of a velocity and a position of the at least one flexible manipulating mechanism.

12. The apparatus of claim 1, wherein the end effector further comprises a cutting surface and a blunt surface configured to prevent damage to at least one of the fruit or vegetable and an environment of the fruit or vegetable.

13. The apparatus of claim 1, wherein manipulating includes impacting at least one of an agricultural product and an environment of the agricultural product.

14. The apparatus of claim 1, wherein the flexible manipulating mechanism includes at least one interlocking flexible component configured to direct the flexible manipulating mechanism.

15. The apparatus of claim 14, wherein there are three interlocking flexible components connected to a single hub.

16. The apparatus of claim 14, wherein the hub is extruded having a hollow configuration.

17. The apparatus of claim 14, wherein at least one force is applied to the at least one interlocking component to steer the manipulating mechanism through at least one of bending, shear, and tension.

18. The apparatus of claim 14, wherein the computing device controls at least one of the interlocking flexible components based upon, at least in part, at least one of the velocity and the position of the fruit or vegetable.

19. The apparatus of claim 14, wherein the at least one interlocking flexible component is configured to control a direction of the manipulating mechanism through at least one of bending, shear, and tension.

20. The apparatus of claim 1, wherein the manipulating mechanism is configured to manipulate at least one additional object that interacts with the fruit or vegetable.

21. A harvesting apparatus comprising:
a plurality of housings each configured to include a plurality of continuously flexible and extendable manipulating mechanisms operatively connected with the plurality of housings, the plurality of flexible manipulating mechanisms each including an end effector having a cutting surface;
at least one forcibly actuated piston associated with each of the plurality of flexible manipulating mechanisms, the piston configured to deploy a portion of at least one of the plurality of flexible manipulating mechanisms upon receiving a control signal;

a plurality of imaging devices associated with the housing, the plurality of imaging devices configured to generate an imaging signal corresponding to fruit or vegetable; and a computing device configured to receive the imaging signal from the plurality of imaging devices and to direct the end effector of at least one of the plurality of flexible manipulating mechanisms towards the fruit or vegetable based upon, at least in part, at least one of the position and velocity of the fruit or vegetable, the computing device configured to provide at least one mid-course correction to the at least one flexible manipulating mechanism after deployment, wherein the computing device is configured to calculate a velocity and a position of the fruit or vegetable.

22. The harvesting apparatus of claim 21, wherein the control signal is based upon, at least in part, the imaging signal.

23. A mobile harvesting system comprising:

an attachment mechanism configured to be attached to a vehicle, the attachment mechanism configured to contain a plurality of harvesting devices, wherein each of the plurality of harvesting devices comprises:

a plurality of housings each configured to include a plurality of continuously flexible and extendable manipulating mechanisms operatively connected with the housing, each of the plurality of flexible manipulating mechanisms including an end effector configured to strike a stem associated with a fruit or vegetable;

a first imaging device associated with the plurality of housings, the first imaging device configured to indicate a position of the fruit or vegetable; and a computing system in communication with the plurality of harvesting devices, the computing system configured to receive an imaging signal from the first imaging device and to direct the at least one flexible manipulating mechanism towards the fruit or vegetable based upon, at least in part, the imaging signal wherein the computing device is configured to calculate a velocity and a position of the fruit or vegetable.

* * * * *